(12) United States Patent
O'Neill et al.

(10) Patent No.: US 6,946,647 B1
(45) Date of Patent: Sep. 20, 2005

(54) MULTICOLOR STARING MISSILE SENSOR SYSTEM

(75) Inventors: Mary Dominique O'Neill, Santa Barbara, CA (US); William Hale Wellman, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 567 days.

(21) Appl. No.: 09/636,100

(22) Filed: Aug. 10, 2000

(51) Int. Cl.[7] ................................................ G02B 6/06
(52) U.S. Cl. .................................... 250/227.2; 250/554
(58) Field of Search .......................... 250/353, 339.02, 250/330, 216, 227.11, 227.2, 554, 578.1; 340/577, 555, 556, 557; 385/43, 115, 121

(56) References Cited

U.S. PATENT DOCUMENTS

| | | | | |
|---|---|---|---|---|
| 4,099,833 A | * | 7/1978 | Tosswill ...................... 348/43 |
| 4,323,925 A | * | 4/1982 | Abell et al. .................. 348/340 |
| 4,701,624 A | * | 10/1987 | Kern et al. .................. 250/554 |
| 4,896,965 A | * | 1/1990 | Goff et al. ................... 356/417 |
| 4,932,747 A | * | 6/1990 | Russell et al. ............... 385/115 |
| 5,053,765 A | * | 10/1991 | Sonehara et al. ...... 340/815.31 |
| 5,346,655 A | * | 9/1994 | Blyler et al. ................ 264/1.28 |
| 5,715,345 A | * | 2/1998 | McKinley .................... 385/115 |
| 5,930,433 A | * | 7/1999 | Williamson et al. ......... 385/116 |
| 5,943,463 A | * | 8/1999 | Unuma et al. ............... 385/119 |
| 6,049,558 A | | 4/2000 | Harada et al. |
| 6,112,003 A | * | 8/2000 | Bybee et al. ................ 385/116 |
| 6,175,678 B1 | * | 1/2001 | Sanghera et al. ........... 385/116 |
| 6,271,510 B1 | * | 8/2001 | Boxen ...................... 250/208.1 |
| 6,292,608 B1 | * | 9/2001 | Toh .............................. 385/43 |
| 6,618,530 B1 | * | 9/2003 | Lundin ........................ 385/121 |

FOREIGN PATENT DOCUMENTS

| | | |
|---|---|---|
| DE | 3932845 A | 4/1991 |
| DE | 4433545 A | 3/1996 |
| JP | 60-058521 * | 4/1985 |

\* cited by examiner

*Primary Examiner*—Que T. Le
(74) *Attorney, Agent, or Firm*—William C. Schubert; Karl A. Vick

(57) ABSTRACT

A sensor system for viewing the light energy of a scene has an imaging detector which converts incident light energy into an electrical signal. Two colors are separately imaged by the detector in two imaging regions. The imaging system for each color includes a color filter positioned between the scene and the respective region of the detector, an optical train that focuses filtered color scene energy, and an optical fiber bundle having an input end that receives the respective color scene energy from the optical train and an output end that directs the color scene energy onto the respective region of the detector using a nonlinear mapping. The optical fiber bundle is formed of a plurality of optical fibers wherein each of the optical fibers has an input shape and size at its input end and an output shape and size at its output end. The output shape and size are different from the input shape and size. The sensor system further includes an electronic device operable to read the electrical signal of the detector, and image-processing electronics.

19 Claims, 3 Drawing Sheets

MULTICOLOR STARING MISSILE SENSOR SYSTEM

This invention relates to a sensor system, and, more particularly, to a sensor system used to detect threats posed by missiles fired at an aircraft.

BACKGROUND OF THE INVENTION

Missiles fired at aircraft are usually guided either by a light seeker or by radar. Of the various types of seekers, infrared light seekers pose some of the greatest problems to aircraft defense. Unlike radar seekers, infrared seekers are passive and do not emit a detectable signal prior to the firing of the missile. Pilots therefore have little warning of their presence prior to the firing of the missile. Infrared-guided missile systems are relatively inexpensive, and human-portable units are widely available.

There has been a continuing effort to develop sensor systems that are carried on aircraft and are used to detect missile threats, particularly infrared-guided missiles. The sensor system must be effective to detect the infrared signature of a relatively small-sized missile at as great a distance as possible, in order to give the pilot the greatest time to take evasive action or to trigger countermeasures. In one approach, a wide-angle, two-color staring sensor system has been suggested to be particularly effective in detecting threats. This approach uses a two-color "sandwich" detector in the sensor. The technology of such a two-color detector is complex, still under development, and expected to be relatively expensive when finally perfected. Additionally, it is expected to have limited resolution, sensitivity, and clutter-rejection capability, particularly when mounted on a fast-moving aircraft platform where there is a tendency for digital images to be smeared in some viewing orientations.

There is an ongoing need for an improved approach to a sensor system for use in an aircraft, particularly for detection of missile threats. The present invention fulfills this need, and further provides related advantages.

SUMMARY OF THE INVENTION

The present invention provides a sensor system for sensing the energy of a scene, particularly in the infrared range. The sensor system employs a staring sensor, so that there are no moving parts that might reduce its reliability. It may be made in a single-color or multicolor functionality. The sensor system achieves excellent resolution while maximizing sensitivity through a short image integration time that also reduces smearing of the image. The detector is a single-color detector structure, whether the sensor has a single-color or multicolor functionality, so that the development, complexity, and cost associated with a two-color detector are not encountered. The sensor system is packaged in a lightweight, small package that is convenient for many applications.

A sensor system for viewing light energy from a scene comprises a detector which converts incident light energy into an electrical signal; an optical train that focuses the light energy from the scene; and an optical fiber bundle having an input end that receives the light energy from the optical train and an output end that directs the light energy onto the detector. The detector is preferably an imaging detector having a detector pixel array. The optical fiber bundle comprises a plurality of optical fibers wherein each fiber has an input shape and size at its input end and an output shape and size at its output end, and where the output shape and size are different from the input shape and size.

In a preferred approach, the light energy from the optical train is mapped nonlinearly onto the detector. Desirably, the input shape of each fiber is substantially in the form of a rectangle, and the output shape is substantially in the form of a square. The fiber input size of each respective optical fiber is preferably larger than the fiber output size of each respective optical fiber. The sensor system also typically includes an electronic device operable to read the electrical signal of the detector, and image-processing electronics. Optionally, there is a color filter positioned between the scene and the detector. The detector may be single-color or multicolor functionality.

The sensor system may use a multiple side-by-side detector configuration, each of which detectors is a single-color detector and is thus easier to fabricate than a multicolor detector. Such a sensor system comprises a detector, preferably having an imaging detector array, which converts incident light energy into an electrical signal. The detector has a first-color region and a second-color region. A first-color imaging system comprises a first-color filter positioned between the scene and the first color region of the detector, a first-color optical train that focuses first-color scene energy onto the first-color region of the detector, and a first-color optical fiber bundle having a first-color input end that receives the first-color scene energy from the first-color optical train and a first-color output end that directs the first-color scene energy onto the first-color region of the detector. The first-color optical fiber bundle comprises a plurality of first-color optical fibers wherein each of the first-color optical fibers has a first-color fiber input shape and size at its first-color input end and a first-color output shape and size at its first-color output end. The first-color output shape and size are different from the first-color input shape and size. A second-color imaging system comprises a second-color filter positioned between the scene and the second-color region of the detector, a second-color optical train that focuses second-color scene energy onto the second-color region of the detector, and a second-color optical fiber bundle having a second-color input end that receives the second-color scene energy from the second-color optical train and a second-color output end that directs the second-color scene energy onto the second-color region of the detector. The second-color optical fiber bundle comprises a plurality of second-color optical fibers wherein each of the second-color optical fibers has a second-color fiber input shape and size at its second-color input end and a second-color output shape and size at its second-color output end. The second-color output shape and size are different from the second-color input shape and size. The additional and/or preferred features described above for the single-color sensor system may be provided with either or both imaging systems of the two-color sensor system. Additional color imaging systems may be added if desired. The detector may instead be a flat-plane configuration in which the colors are superimposed in a "sandwich" geometry.

The present approach thus provides a single-color or multicolor (two or more colors) staring sensor system. It may use a single detector, even for multicolor sensors, which simplifies the problems of image physical registration and time registration. There is good resolution as well as good sensitivity and short integration times.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
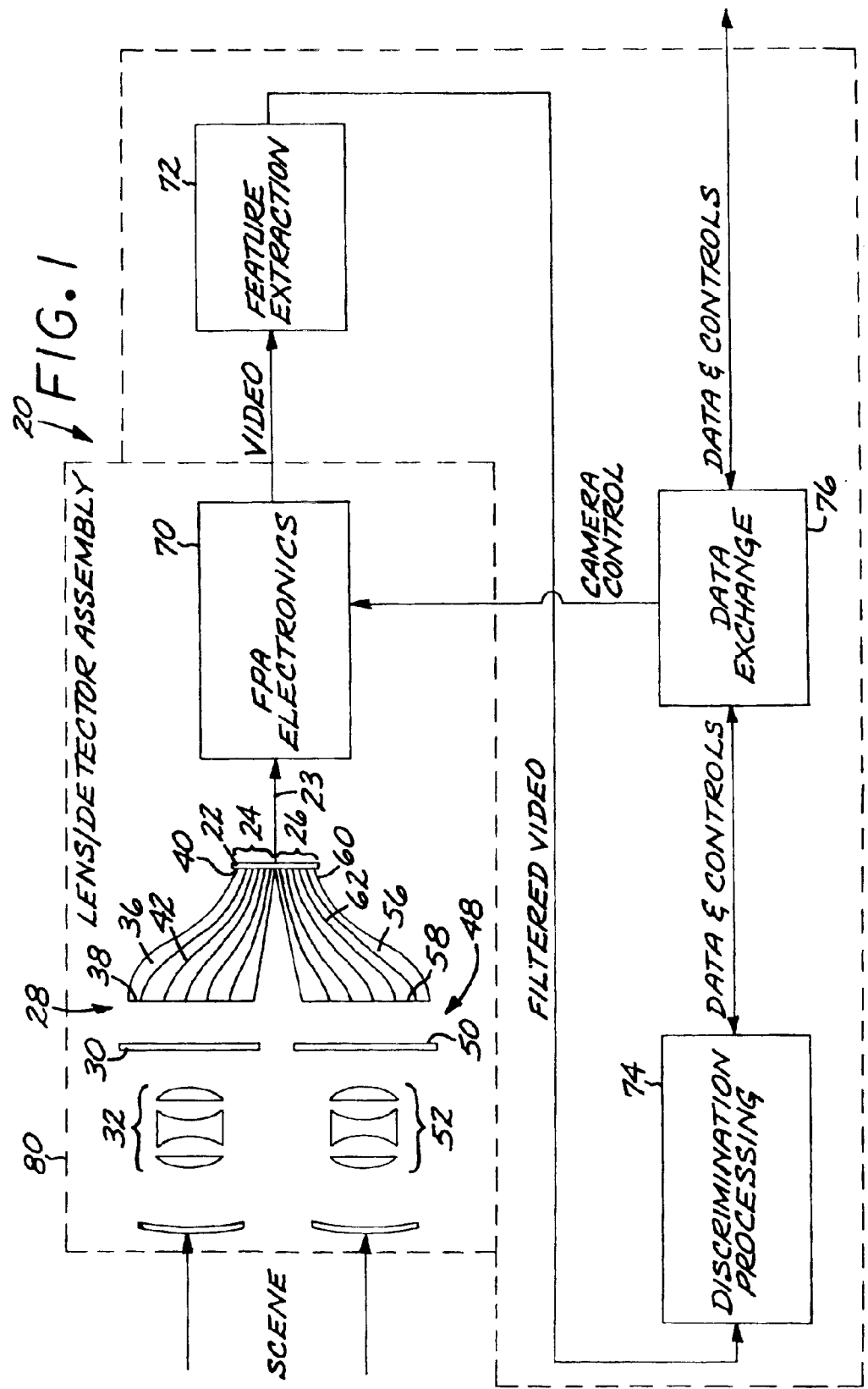
FIG. 1 is a schematic system diagram of the sensor system.

FIG. 1 depicts a sensor system 20 for viewing light energy from a scene. The sensor system 20 includes a detector 22 which converts incident light energy into an electrical signal 23. The detector 22 preferably comprises an imaging digital focal plane array (FPA) sensitive to a selected wavelength or range of wavelengths of interest. The primary interest of the inventors is light in the infrared, and the detector 22 is sensitive to light in that range. Imaging detectors 22 operable in the infrared are known in the art. In a common case, the imaging detector 22 has a 512×512 detector array of pixels.

In a preferred embodiment, the detector 22 has a first-color region 24 and a second-color region 26. As will be explained in more detail, this preferred embodiment is a two-color sensor system 20. The desirability of using two colors in sensor systems is known in the art, but the present approach provides an advantageous way for implementing the two-color approach. The present approach is operable with any pair of colors within the range of the detector 22, and the selection of the two specific colors to be analyzed is not a part of the present invention. If instead the sensor system 20 is a single-color embodiment, the entire detector is devoted to that single color; if the sensor system 20 operates with more than two colors, the detector 22 has regions corresponding to the number of colors. In most instances, it is not necessary or desirable for the sensor system 20 to operate with more than two colors.

The sensor system 20 includes a first-color imaging system 28 comprising a first-color filter 30 positioned between the scene and the first-color region 24 of the detector 22. A first-color optical train 32 focuses first-color scene energy onto a first-color input end 38 of a first-color optical fiber bundle 36 of the first-color region 24 of the detector 22. The first-color optical train 32 is formed of lenses and/or mirrors that achieve the desired focusing of the first-color scene energy. Such lenses and/or mirrors are selected according to established optics principles. In the illustration, the first-color filter 30 is positioned between the first-color optical train 32 and the first-color optical fiber bundle 36, but that need not be the case and other operable positioning may be used.

The first-color optical fiber bundle 36 has the first-color input end 38 that receives the first-color scene energy from the first-color optical train 32, and a first-color output end 40 that directs the first-color scene energy onto the first-color region 24 of the detector 22. The first-color optical fiber bundle 36 is formed of a plurality of first-color optical fibers 42.

Figure 2:
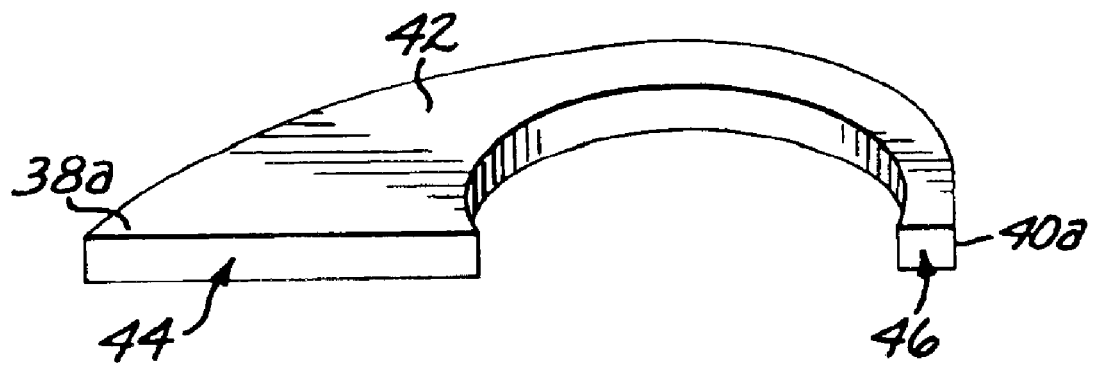
FIG. 2 is perspective view of an optical fiber in an optical fiber bundle.

One of the first-color optical fibers 42 is illustrated in FIG. 2. (This description is applicable to the single type of optical fiber in a single-color sensor system and the multiple types of optical fibers in a multi-color sensor system, as well.)

Each of the first-color optical fibers 42 has a first-color fiber input shape and size, numeral 44, at its first-color input end 38a and a first-color fiber output shape and size, numeral 46, at its first-color output end 40a. The first-color fiber output shape and size 46 are different from the first-color fiber input shape and size 44. In the embodiment of FIG. 2, the first-color fiber input shape 46 is substantially rectangular with a ratio of length to width of about 8:1, and the first-color fiber output shape 46 is substantially square with a ratio of the sides of about 1:1. The first-color input size is accordingly about 8 times that of the first-color output size. The first-color optical fibers 42 are thus tapered from the larger input end 38a to the smaller output end 40a. The advantages of this transformation of pixel shape as used with a spatial reorientation, such that a typical square pixel detector can be used, will be explained subsequently.

The rectangular shaping of the first-color optical fibers 42 achieves improved resolution in one dimension to maximize the sensitivity of the sensor system 20. Because the potential target (e.g., a missile) in the scene and the resulting image has a small spatial extent, clutter rejection is achieved by spatially filtering objects in the image that are larger than the potential target. Ideally, then, the resolution cell is no larger than the maximum potential angular size of the potential target. However, small square fiber input shapes, the usual approach in pixilated images, would require a larger focal plane array detector than is achievable at present for a wide field-of-view system. In addition, this resolution would be better than the hand-off accuracy that is required. By creating larger rectangular collection elements at the input end, the required high spatial resolution is achieved with fewer pixel elements than would otherwise be required. The angular accuracy of the sensor system 20 is determined by the long dimension of the input end 38a of the optical fibers, while the resolution for target spatial matched filtering is determined by the narrow dimension. In an example, assuming a 512×512 pixel focal plane array and a 120 degree field of view, the accuracy is 11.6 mradians (milliradians) and the resolution is 1.45 mradians.

The tapered fibers also increase the energy collection area significantly over the area of a conventional focal plane array detector. In the example of FIG. 2, with an 8×1 input end and a 1×1 output end, the increased area of a factor of 8 in the entrance aperture enables a corresponding decrease in integration time. The sensor system 20 is therefore more resistant to blurring of the image than a conventional sensor system.

The pixels that are defined by the first-color input end 38a of the first-color optical fibers 42 are mapped or directed onto selected pixels of the first-color region 24 of the detector 22. In conventional mapping practice, the pixels are mapped linearly. That is the (n,m) pixel of the scene is necessarily directed to the (n,m) pixel of the detector (where n and m are the row and column indices of each pixel). The present approach is a nonlinear approach wherein the (n,m) pixel of the scene is not necessarily directed to the (n,m) pixel of the detector.

Figure 3:
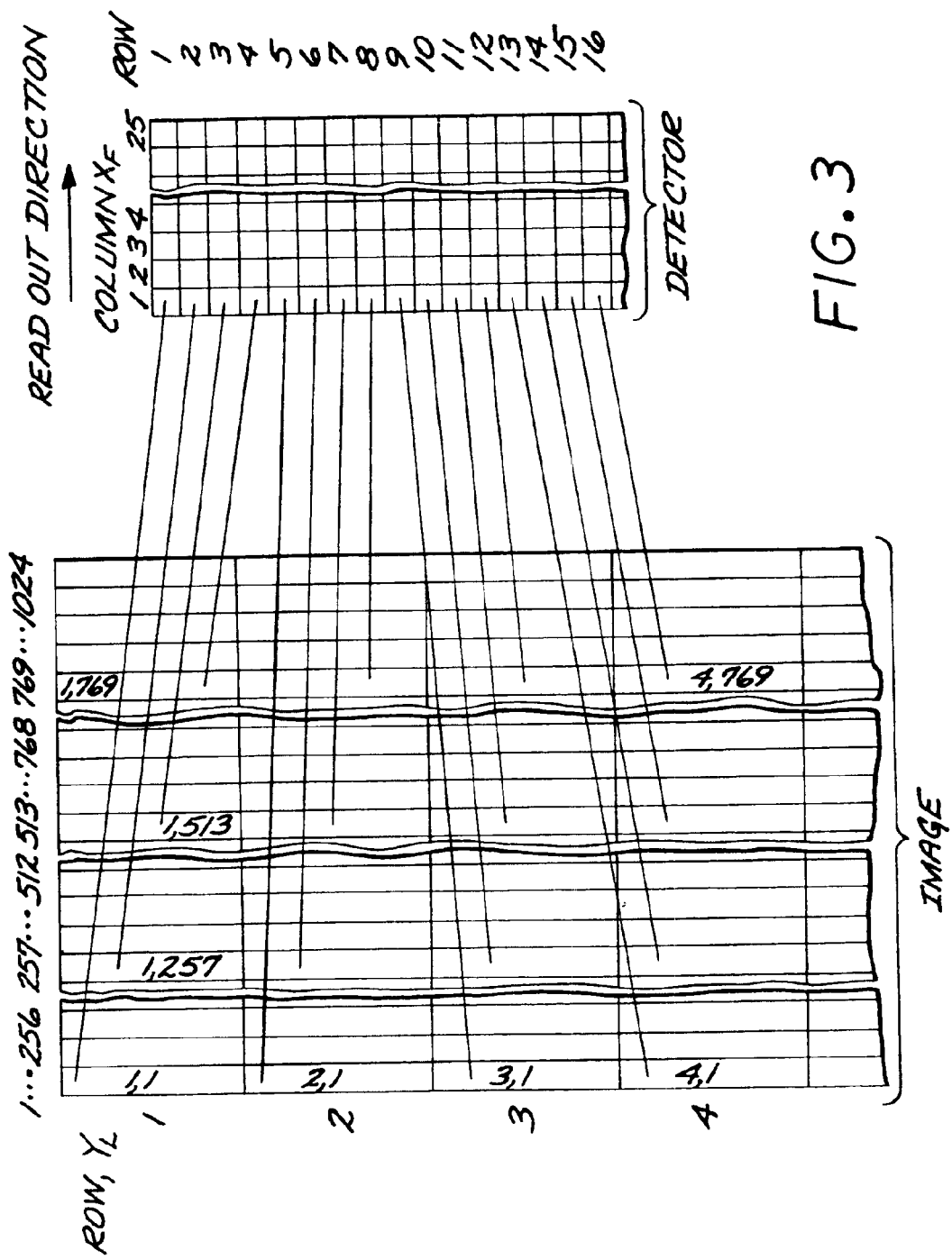
FIG. 3 is a schematic depiction of nonlinear mapping of the fiber optic pixel structure to the detector array pixel structure.

FIG. 3 illustrates the preferred mapping approach applied to a specific case by way of illustration. This nonlinear mapping approach is selected to allow a standard detector array to be used with rectangular input pixels. In this illustration, a 128×1024 array of first-color scene energy at the first-color input end 38 is mapped onto one-half of a 512×512 detector array (the other half receives the second-color image). The $(X_L, Y_L)$ pixel of the first-color scene energy is mapped to the $(X_F, Y_F)$ pixel of the first-color region 24 of the detector 22. The first-color image uses all rows of the detector 22 and columns 1–256 in this example. The following regions describe the preferred mapping approach:

$$X_F=X_L-(256)(Y_F-1)\ Y_F=4(Y_L-1)+n$$

where $n=1$ for $X_L \leq 256$ $n=2$ for $257 \leq X_L \leq 512$ $n=3$ for $513 \leq X_L \leq 768$ $n=4$ for $769 \leq X_L \leq 1024$ The sensor system 20 further includes a second-color imaging system 48 comprising a second-color filter 50 positioned between the scene and the second-color region 26 of the detector 22. A second-color optical train 52 focuses second-color scene energy onto a front face 58 of the second-color fiber optic bundle 56 of the second-color region 26 of the detector 22. The second-color optical train 52 is formed of lenses and/or mirrors that achieve the desired focusing of the second-color scene energy. Such lenses and/or mirrors are selected according to established optics principles, and are preferably substantially identical to the lenses and/or mirrors of the first-color optical train 32. In the illustration, the second-color filter 50 is positioned between the second-color optical train 52 and the second-color fiber optic bundle 56, but that need not be the case and other operable positioning may be used.

The second-color optical fiber bundle 56 has the second-color input end 58 that receives the second-color scene energy from the second-color optical train 52, and a second-color output end 60 that directs the second-color scene energy onto the second-color region 26 of the detector 22. The second-color optical fiber bundle 56 is formed of a plurality of second-color optical fibers 62.

The second-color optical fibers 62 are preferably tapered in the same manner as described for the first-color optical fibers 42. FIG. 2 and the discussion of FIG. 2 are incorporated as to the nature of the second-color optical fibers 62.

The second-color scene energy on the second-color optical train 52 is mapped nonlinearly onto the second-color region 26 of the detector 22 in the same manner as discussed earlier for the first-color scene energy. The prior description is incorporated by reference here.

The mapping of the second-color scene energy pixels onto the second-color region 26 of the detector 22 follows the approach discussed above, which is incorporated here, except that $X_F$ is offset by 256 to utilize columns 257 through 512 of the detector 22.

The detector 22 converts the incident light energy to electrical signals, which are processed by its associated electronics 70 to compensate for detector irregularities, perform calibration, and perform related functions. The processed electrical signals are provided to a computer system that analyzes the electrical signals for the presence of a feature, specifically a missile threat. The presence of a feature is first determined, numeral 72, by appropriate digital filtering. Any such feature is then analyzed as to its nature, numeral 74, using established criteria This information is then used to control the detector 22, numeral 76. The data on a feature judged to be a treat is provided to other processing electronics, not shown, such as a fire control system. Approaches to these elements 70, 72, 74, and 76 are known in the art.

Figure 4:
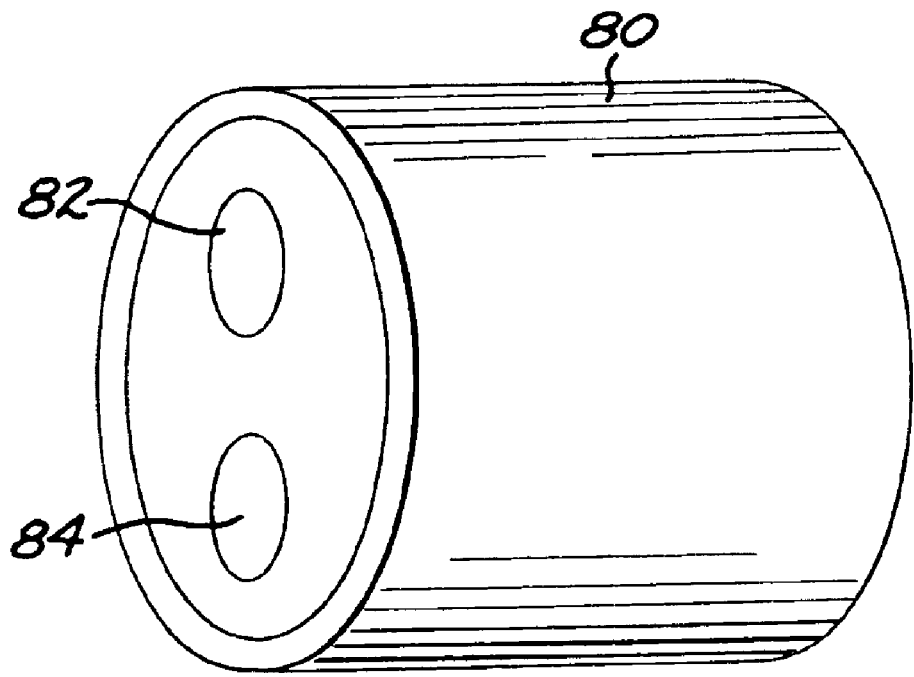
FIG. 4 is a perspective view of a packaged lens and detector assembly.

FIG. 4 illustrates the physical packaging of the non-electronic portions of the lens/detector assembly 80 (that is, excluding elements 70, 72, 74, and 76) of the sensor system 20, in an application under development by the inventors. The lens/detector assembly is housed in a cylinder about 4 ¼ inches in diameter and 4 ¾ inches long. There are two viewing apertures 82 and 84, for the first-color imaging system 28 and the second color imaging system 48, respectively.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensor system for viewing light energy from a scene, comprising:

a detector which converts incident light energy into an electrical signal, the detector including an imaging detector array;

an optical train that focuses the light energy of the scene; and an optical fiber bundle having an input end that receives the scene from the optical train and an output end that directs the energy of the scene onto the detector array, the optical fiber bundle comprising a plurality of optical fibers wherein each fiber has an input shape and size at its input end and an output shape and size at its output end, the output shape and size being different from the input shape and size, and wherein the scene energy from the optical train is mapped nonlinearly onto the detector array.

2. The sensor system of claim 1, wherein the sensor system further includes a color filter positioned between the scene and the detector.

3. The sensor system of claim 1, wherein the input shape of each fiber is substantially in the form of a rectangle and the output shape is substantially in the form of a square.

4. The sensor system of claim 1, wherein the fiber input size of each respective optical fiber is larger than the fiber output size of that optical fiber.

5. The sensor system of claim 1, wherein the sensor system further includes an electronic device operable to read the electrical signal of the detector, and image-processing electronics.

6. A sensor system for viewing light energy from a scene, comprising:

an imaging detector which converts incident light energy into an electrical signal, the imaging detector having a first-color region, and a second-color region;

a first-color imaging system comprising:

a first-color filter positioned between the scene and the first-color region of the imaging detector, a first-color optical train that focuses first-color scene energy onto the first-color region of the imaging detector, and a first-color optical fiber bundle having a first-color input end that receives the first-color scene energy from the first-color optical train and a first-color output end that directs the first-color scene energy onto the first-color region of the imaging detector, wherein the first-color scene energy from the first-color optical train is mapped nonlinearly onto the first-color region of the imaging detector, the first-color optical fiber bundle comprising a plurality of first-color optical fibers wherein each of the first-color optical fibers has a first-color fiber input shape and a first-color fiber input size at its first-color input end and a first-color output shape and first-color fiber output size at its first-color output end, the first-color output shape and the first-color fiber output size being different from the first-color input shape and the first-color fiber input size; and a second-color imaging system comprising:
a second-color filter positioned between the scene and the second-color region of the imaging detector,
a second-color optical train that focuses second-color scene energy onto the second-color region of the imaging detector, and
a second-color optical fiber bundle having a second-color input end that receives the second-color scene energy from the second-color optical train and a second-color output end that directs the second-color scene energy onto the second-color region of the imaging detector, the second-color optical fiber bundle comprising a plurality of second-color optical fibers wherein each of the second-color optical fibers has a second-color fiber input shape and a second-color fiber input size at its second-color input end and a second-color output shape and a second-color fiber output size at its second-color output end, the second-color output shape and the second-color fiber output size being different from the second-color input shape and the second-color fiber input size.

7. A sensor system for viewing light energy from a scene, comprising:
an imaging infrared detector which converts incident light energy into an electrical signal, the imaging detector having
a first-color region, and
a second-color region;
a first-color imaging system comprising:
a first-color filter positioned between the scene and the first-color region of the imaging detector,
a first-color optical train that focuses first-color scene energy onto the first-color region of the imaging detector, and
a first-color optical fiber bundle having a first-color input end that receives the first-color scene energy from the first-color optical train and a first-color output end that directs the first-color scene energy onto the first-color region of the imaging detector, wherein the first-color scene energy from the first-color optical train is mapped nonlinearly onto the first-color region of the imaging detector, the first-color optical fiber bundle comprising a plurality of first-color optical fibers wherein each of the first-color optical fibers has a first-color fiber input shape and size at its first-color input end and a first-color output shape and size at its first-color output end, the first-color output shape and size being different from the first-color input shape and size; and
a second-color imaging system comprising:
a second-color filter positioned between the scene and the second-color region of the imaging detector,
a second-color optical train that focuses second-color scene energy onto the second-color region of the imaging detector, and
a second-color optical fiber bundle having a second-color input end that receives the second-color scene energy from the second-color optical train and a second-color output end that directs the second-color scene energy onto the second-color region of the imaging detector, the second-color optical fiber bundle comprising a plurality of second-color optical fibers wherein each of the second-color optical fibers has a second-color fiber input shape and size at its second-color input end and a second-color output shape and size at its second-color output end, the second-color output shape and size being different from the second-color input shape and size.

8. The sensor system of claim 6, wherein
the first-color region of the imaging detector is sensitive to light energy that passes through the first-color filter and light energy that passes through the second-color filter, and
the second-color region of the imaging detector is sensitive to light energy that passes through the first-color filter and light energy that passes through the second-color filter.

9. The sensor system of claim 6, wherein the first-color region and the second-color region are in the same plane.

10. The sensor system of claim 6, wherein each first-color fiber has its first-color fiber input shape substantially in the form of a rectangle and its first-color fiber output shape is substantially in the form of a square.

11. The sensor system of claim 6, wherein each second-color fiber has its second-color fiber input shape substantially in the form of a rectangle and its second-color fiber output shape is substantially in the form of a square.

12. The sensor system of claim 6, wherein the first-color fiber input size of the first-color optical fibers is larger than the first-color fiber output size of the first-color optical fibers.

13. The sensor system of claim 6, wherein the second-color fiber input size of the second-color optical fibers is larger than the second-color fiber output size of the second-color optical fibers.

14. The sensor system of claim 6, wherein the sensor system further includes
an electronic device operable to read the electrical signal of the imaging detector, and
image-processing electronics.

15. A sensor system for viewing scene energy, comprising:
an imaging detector which converts incident light energy into an electrical signal, the imaging detector having a first-color region and a second-color region;
a first-color imaging system comprising:
a first-color filter positioned between the scene and the first-color region of the imaging detector;
a first-color optical train that focuses first-color scene energy onto the first-color region of the imaging detector, and
a first-color optical fiber bundle having a first-color input end that receives the first-color scene energy from the optical train and a first-color output end that directs the first-color scene energy onto the first-color region of the imaging detector, wherein the first-color scene energy is mapped nonlinearly onto the first-color region of the imaging detector, the first-color optical fiber bundle comprising a plurality of first-color optical fibers wherein each of the first-color optical fibers has a first-color fiber input shape and size at its first-color input end and a first-color output shape and size at its first-color output end, the first-color output shape and size being different from the first-color input shape and size;

a second-color imaging system comprising:
- a second-color filter positioned between the scene and the second-color region of the imaging detector;
- a second-color optical train that focuses second-color scene energy onto the second-color region of the imaging detector, and
- a second-color optical fiber bundle having a second-color input end that receives the second-color scene energy from the optical train and a second-color output end that directs the second-color scene energy onto the imaging detector, wherein the second-color scene energy is mapped nonlinearly onto the second-color region of the imaging detector, the second-color optical fiber bundle comprising a plurality of second-color optical fibers wherein each of the second-color optical fibers has a second-color fiber input shape and size at its second-color input end and a second-color output shape and size at its second-color output end, the second-color output shape and size being different from the second-color input shape and size;

an electronic device operable to read the electrical signal of the imaging detector; and image-processing electronics.

16. A sensor system for viewing light energy from a scene, comprising:
- an imaging detector which converts incident light energy into an electrical signal, the detector including an imaging detector array;
- an optical train that focuses the light energy of the scene; and
- an optical fiber bundle having an input end that receives the scene from the optical train and an output end that directs the energy of the scene onto the detector array, the optical fiber bundle comprising a plurality of optical fibers wherein each fiber has an input shape and size at its input end and an output shape and size at its output end, the output shape and size being different from the input shape and size.

17. The sensor system of claim 6, wherein the detector is an infrared imaging detector.

18. The sensor system of claim 15, wherein the detector is an infrared imaging detector.

19. A sensor system for viewing light energy from a scene, comprising:
- a detector which converts incident light energy into an electrical signal, the detector including an imaging detector array;
- an optical train that focuses the light energy of the scene; and
- an optical fiber bundle having an input end that receives the scene from the optical train and an output end that directs the energy of the scene onto the detector array, the optical fiber bundle comprising a plurality of optical fibers wherein each fiber has a rectangular input shape at its input end and a square output shape at its output end.

* * * * *

UNITED STATES PATENT AND TRADEMARK OFFICE
CERTIFICATE OF CORRECTION

PATENT NO. : 6,946,647 B1
DATED : September 20, 2005
INVENTOR(S) : Mary Dominique O'Neill and William Hale Wellman It is certified that error appears in the above-identified patent and that said Letters Patent is hereby corrected as shown below:

Title page,
Item [56], References Cited, U.S. PATENT DOCUMENTS, add:
-- 5,303,373 A  *  12/1994  Harootian..........385/115 --.

Signed and Sealed this

Twenty-fourth Day of January, 2006

JON W. DUDAS
*Director of the United States Patent and Trademark Office*